United States Patent [19]

Drees et al.

[11] 4,115,031

[45] Sep. 19, 1978

[54] HUB SPRING MOMENT ISOLATION IN UNDERSLUNG TWO-BLADED TEETERING ROTOR

[75] Inventors: Jan M. Drees, Dallas; Walter G. O. Sonneborn, Fort Worth; Jing G. Yen, Arlington, all of Tex.

[73] Assignee: Textron, Inc., Providence, R.I.

[21] Appl. No.: 460,353

[22] Filed: Apr. 12, 1974

[51] Int. Cl.$^2$ ............................................. B64C 11/12
[52] U.S. Cl. ............................... 416/134 A; 244/17.27
[58] Field of Search ..................... 244/17.27; 416/102, 416/134, 135, 136, 148, 141, 226, 134 R, 134 A

[56] References Cited

U.S. PATENT DOCUMENTS

| 2,949,965 | 8/1960 | De Tore et al. | 416/102 |
| 3,288,226 | 11/1966 | Lemont et al. | 416/102 |
| 3,804,552 | 4/1974 | Covington | 416/134 |
| 3,807,896 | 4/1974 | Johnson | 416/148 |

Primary Examiner—Barry L. Kelmachter
Attorney, Agent, or Firm—Richards, Harris & Medlock

[57] ABSTRACT

A method and system which isolates two-per-rev hub spring moment vibrations while providing control power during zero-g flight in a two-bladed teetering rotor helicopter. Hub spring structure is connected between the rotor and the pylon to resist rotor flapping about the teeter axis and thus provide control during zero-g flight. To isolate from the fusilage the hub spring moment two-per-rev vibrations, the rotor is coupled to the pylon below the rotor center of gravity at a distance related to both the hub spring rates and the in-plane frequency of the helicopter blades.

9 Claims, 11 Drawing Figures

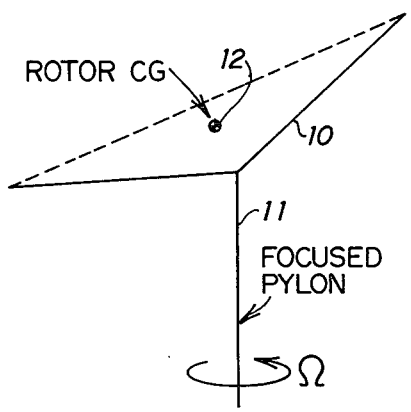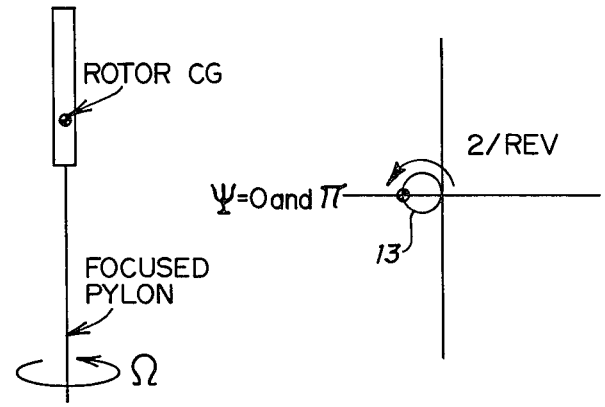
FIG. 1  FIG. 2  FIG. 3
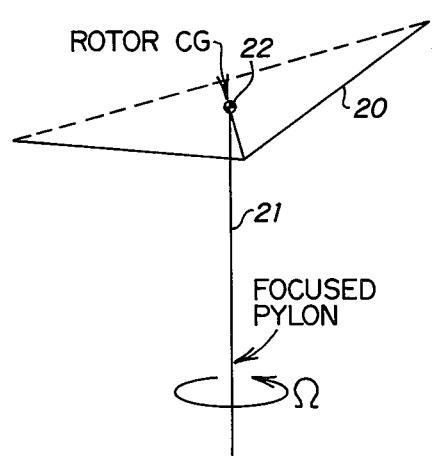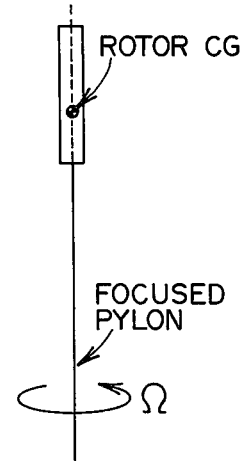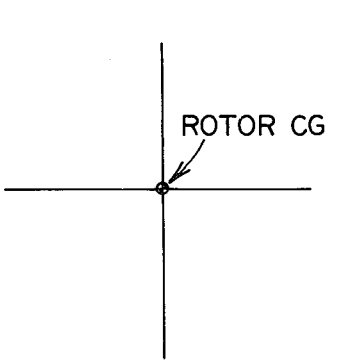
FIG. 4  FIG. 5  FIG. 6

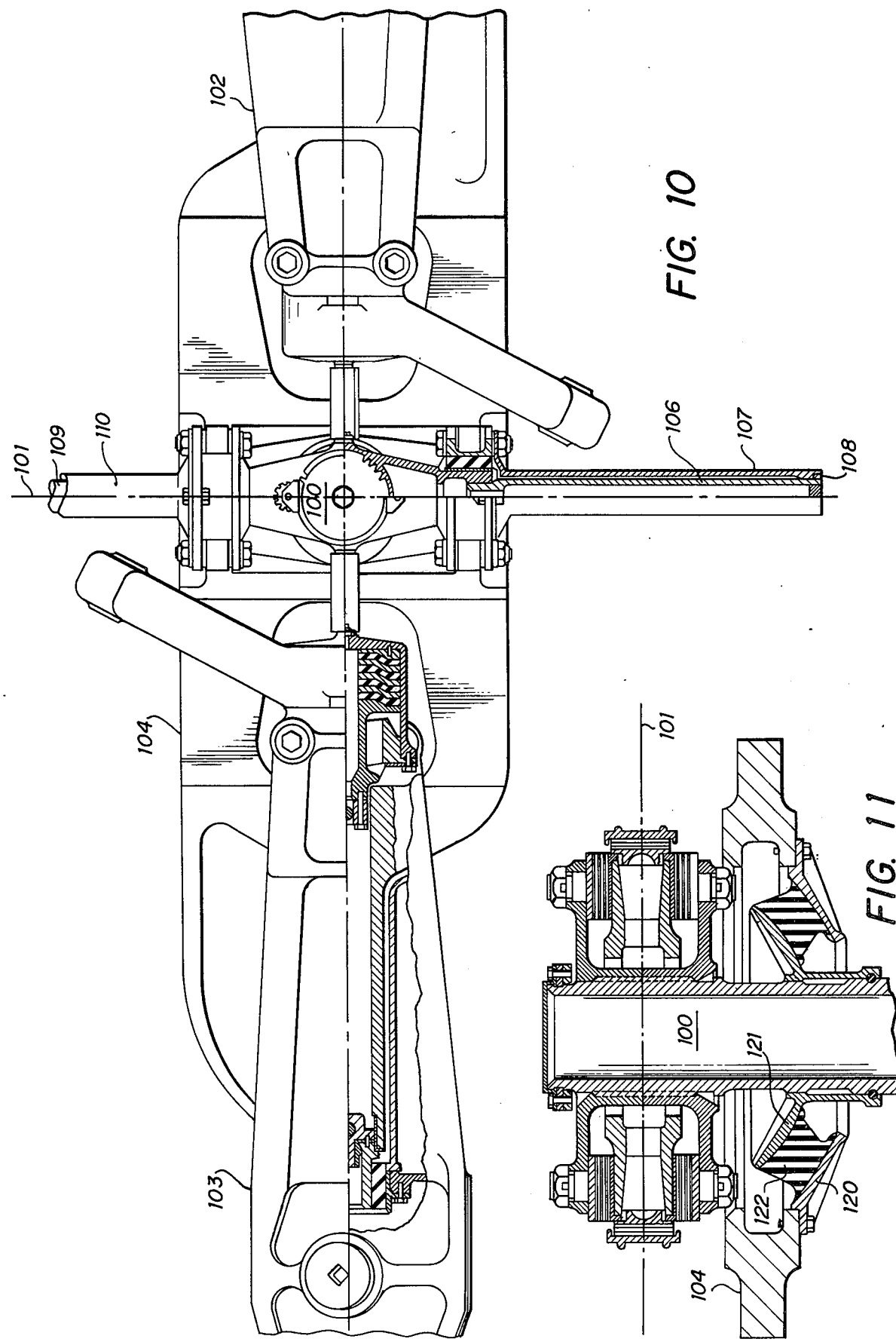

HUB SPRING MOMENT ISOLATION IN UNDERSLUNG TWO-BLADED TEETERING ROTOR

This invention relates to a two-bladed teetering rotor for helicopters with a particular relationship between the in-plane natural frequency of the blades and the underslinging thereof on a pylon.

All rotors generate vibrations at the rotor hub as a function of the number of rotor blades, which vibrations can become an operational problem unless somehow suppressed or eliminated. In U.S. Pat. No. 3,163,378 a system is disclosed involving a focused pylon applied to a two-bladed rotor which isolates two-per-rev in-plane shear forces applied at the hub. In U.S. patent application Ser. No. 346,951, filed Apr. 2, 1973, now U.S. Pat. No. 3,857,534, and in U.S. Pat. No. 3,845,917, structure involving nodalization is disclosed to isolate the fuselage from vertical hub shear forces (two-per-rev in the case of the two-bladed rotor). These systems have proved to be very effective in isolating from the fuselage aerodynamic two-per-rev excitations, but there are other two-per-rev vibrations of the two-bladed rotor which must be dealt with.

As the blade flaps relative to the pylon, its plane of rotation, and the plane of rotation of the rotor, tilts relative to the pylon. This causes the center of gravity of the blade to oscillate relative to the axis of the pylon. That is, during each revolution of the rotor, its center of gravity is displaced from the pylon axis when the blades are at the azimuth position for maximum flapping, i.e., when $x = 0$. When the blades are 90° from that maximum position i.e., when $x = \pi$ the center of gravity of the rotor coincides with the axis of the pylon. As viewed from a fixed system, the center of gravity at the rotor travels around a circle at twice the frequency of the rotor and only at one point on the circle does the center of gravity of the rotor coincide with the axis of the pylon. This movement of the rotor center of gravity generates a centrifugal force which gives rise to an undesirable two-per-rev moment about the pylon focal point in a fixed system. It has become a normal practice to eliminate this moment at the hub by underslinging the rotor, so that its center of gravity is coincident with the hinge axis between the rotor and the pylon. In such case, the rotor center of gravity may remain stationary and the helicopter has a smoother ride.

Another source of two-per-rev excitation is a hub spring. Two-bladed teetering rotors tend to have zero control power in zero-g flight. Control power can be provided with a hub spring which provides a spring force acting between the rotor and the pylon. However, spring rates should be kept moderate to prevent them from causing a rotor/pylon instability. It can be shown that about 25% of the one-g control power is adequate for zero-g flight. Such hub spring rates are acceptable as far as rotor/pylon stability is concerned, but the hub spring introduces a two-per-rev hub moment and therefore a two-per-rev fuselage vibration.

In accordance with the present invention, extra rotor underslinging (beyond that position that places the rotor center of gravity on the rotor hinge axis) offsets the effect of the two-per-rev hub spring moment and causes in-plane two-per-rev hub shears that tend to isolate from the fuselage the two-per-rev hub spring moments about the pylon focal point.

In a further aspect, in-plane stiffness has a pronounced effect upon the requirement for extra underslinging. If the in-plane blade flexiblity is above one-per-rev in the rotating system, the flexibility enhances the effect of underslinging and a lesser than otherwise appropriate underslinging is required in order to isolate the two-per-rev hub spring moment. If the blade's in-plane frequency is tuned to exactly one-per-rev, the amount of rotor underslinging becomes dependent of the hub spring rate. Finally, a soft-in-plane, two-bladed teetering rotor requires overslinging, i.e., a greater than otherwise appropriate underslinging, in order to isolate the two-per-rev hub spring moment.

Thus, in accordance with the present invention, a system is provided wherein the two-per-rev hub spring moment is eliminated by controlling the relationship between the blade's in-plane frequency (referred to as the first cantilevered in-plane frequency), the hub spring rate and the amount of underslinging. This permits the achievement of control power in zero-g flight for a two-bladed teetering rotor helicopter without introducing two-per-rev hub spring moments.

In a further and more specific aspect, a pylon is provided with a coupling connected to pivot a teetering axis transverse to the pylon for support of a rotor at a predetermined distance below the teeter axis. A hub spring is connected between the pylon and the rotor to resist flapping of the rotor about the teeter axis thereby to assure control power to the helicopter.

In a more specific aspect, the cantilevered in-plane natural frequency of the blade is one cycle per revolution when the blade is rotating at the normal r.p.m. of the rotor to isolate the pylon from two-per-revolution vibrations produced by moments due to the hub spring.

For a more complete understanding of the present invention and for further objects and advantages thereof, reference may now be had to the following description taken in conjunction with the accompanying drawings in which:

FIGS. 1–3 illustrate the operation of a preconed two-bladed teetering rotor with no underslinging;

FIGS. 4–6 illustrate the operation of a preconed rotor underslung about the rotor center of gravity;

FIG. 10 illustrates one manner of applying a hub spring to an underslung teetering rotor; and FIG. 11 illustrates a different mode of applying hub spring forces to a teetering rotor.

Figure 7:
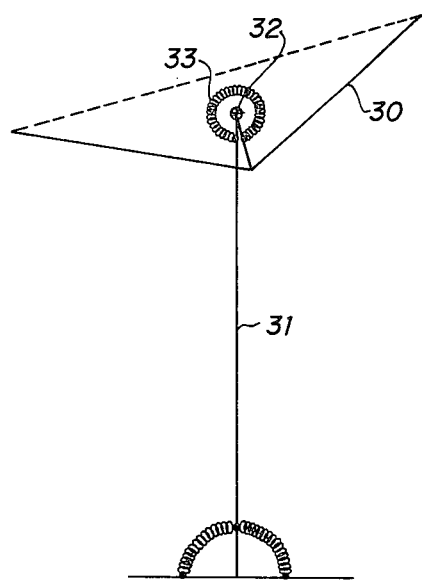
FIG. 7 illustrates the operation without extra underslinging.

FIGS. 1–3 illustrate the variations in position of center of gravity of a preconed two-bladed teetering rotor mounted with no underslinging. In FIG. 1 a two-bladed rotor 10 is mounted on pylon 11 operating at Ω RPM. It is illustrated at the azimuth position for maximum flapping, i.e., when Ψ blade azimuth angle measured from the tail of the aircraft equals 0 and $\pi$. In such case, the center of gravity 12 is displaced a distance $d$ from the axis of the pylon 11. When the blade position is 90° from that shown in FIG. 1, as illustrated in FIG. 2, the center of gravity 12 of the rotor coincides with the axis of the pylon 11.

Thus, as shown in FIG. 3, the trajectory of the center of gravity is represented by the circle 13 of diameter $d$.

FIG. 4 illustrates elimination of the latter moment by underslinging the rotor, i.e., hinging it below its center of gravity. As shown in FIG. 4, a rotor 20 mounted on pylon 21 is mounted with underslinging such that the center of gravity 22 is at the pivotal point. This means that when the angle $\Psi$ equals 0 and $\pi$, the center of gravity is at the axis of the pylon 21. As shown in FIG. 5, the same effect is true when $\Psi$ equals $\pi/2$ and $3\pi/2$. FIG. 6 illustrates the fact that the rotor center of gravity 22 at all times coincides with the axis of the focused pylon.

FIG. 7 illustrates the introduction of a hub spring which interconnects an underslung teetering rotor 30 to a pylon 31. The introduction of the hub spring is for the purpose of providing control power in zero-g flight. In such case, while the center of gravity 32 of rotor 30 coincides with the pivotal point because of the underslinging, the presence of a hub spring 33 introduces two-per-rev vibrations into the pylon 31.

Figure 8:
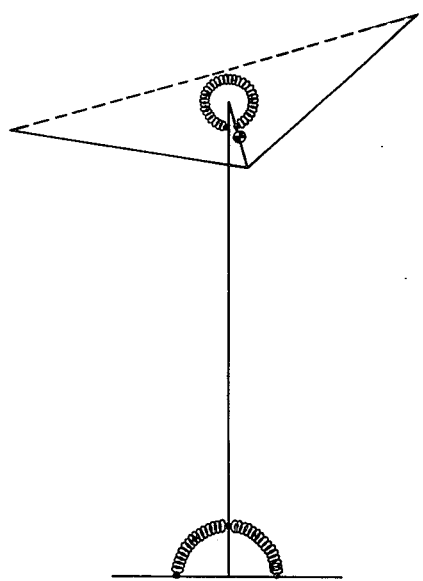
FIG. 8 illustrates the operation with extra underslinging.

It has been found that extra underslinging, as illustrated in FIG. 8, can be introduced in some cases to offset the effect of the fixed system two-per-rev hub spring moment. However, it has further been found that there exists a relationship between the blade in-plane stiffness and the amount of extra underslinging required to overcome the fixed system two-per-rev hub shear forces. Stated otherwise, underslinging is provided so that the center of gravity of a coned rotor is at the hub of the rotor mounting when the rotor operates at its normal speed. When such mounting is provided, control power for zero-g flight is not present. In order to provide such control power, a hub spring is added. The introduction of the hub spring introduces an undesirable two-per-rev moment in the fixed system. Extra underslinging then provides for isolation of the fixed system two-per-revolution hub spring moment, but this requires generally and except for a unique case, that the amount of underslinging must be tailored to the hub spring rate. That unique case is when the blade has an in-plane frequency at one-per-rev.

Figure 9:
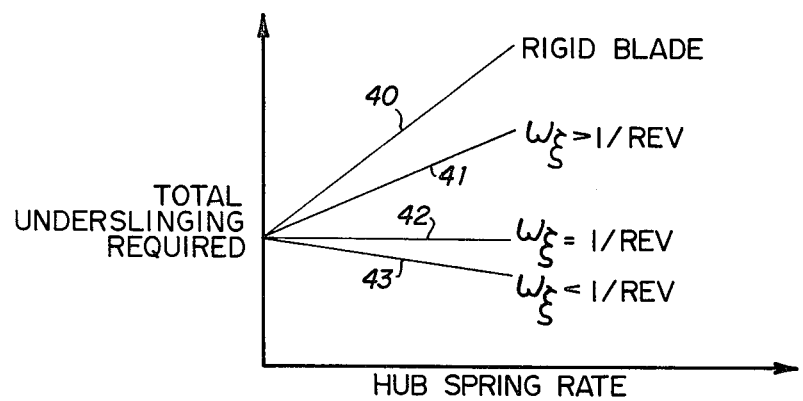
FIG. 9 illustrates the relationship between underslinging and hub spring rate for various in-plane blade frequencies.

As stated, the blade in-plane frequency is referred to as the first cantilevered frequency at which the blade vibrates in the rotating system in the direction of the blade chord. Preferably, the blade is constructed so that the one-per-rev inplane frequency is effective for the normal collective pitch, and, if the in-plane frequency is at the one-per-rev rate, underslinging is independent of the hub spring rate. For systems other than the frequency equaling the one-per-rev frequency, a change in the hub spring rate must be compensated by variation in the amount of underslinging. This is illustrated in FIG. 9 wherein the relationship between the hub spring rate and the underslinging required has been graphically portrayed for a rigid blade, curve 40. A blade in which the in-plane frequency is greater than one-per-rev is illustrated by curve 41. Where the in-plane frequency equals one-per-rev, curve 42 is illustrative. The case where the in-plane frequency is less than one-per-rev is illustrated by curve 43.

It will be seen from curve 42 that in such a case (where the blade in-plane frequency equals one-per-rev) the hub vibration is independent of the hub spring rate. For all other cases, the hub spring rate is tailored to the blade.

More particularly, consider the blades in-plane elastic degree of freedom as a dynamic energy absorber attached to the primary system. A blade with a first cantilevered in-plane frequency of one-per-rev in the rotating frame has a two-per-rev natural frequency in the fixed system. Since the primary system has a frequency below two-per-rev (pylon pitch and roll frequencies are below one-per-rev for most helicopters) and is excited by a two-per-rev forcing function, the blade in-plane system enforces a node at the hub and the blade in-plane motion is 180° out of phase with the two-per-rev excitation.

FIG. 10 illustrates a two-bladed teetering rotor system wherein blades are mounted on a pylon 100 such that the blade can teeter on the pylon 100 about an axis 101. Blades 102 and 103 are connected by usual grips to a yoke 104. Yoke 104 is supported from suitable bearings on axis 101 by linkages leading downward from the top of the mast to the yoke 104.

As further illustrated, the hub spring comprises two sets of concentric tubes. The first set comprises an inner tube 106 which is connected rigidly to the pylon 100 so that the inner end of tube 106 cannot rotate. The outer tube 107 is connected to the outer race of the bearing supporting yoke 104 on axis 101 and thus rotates as the yoke 104 teeters in response to forces on blades 102 and 103. The outer ends are fused together as at point 108 so that the tubes 106 and 107 serve as a spring which opposes teetering of the yoke 104. A second set comprises inner tube 109 and 110 similarly connected and similarly operating to complete the hub spring installation.

FIG. 11 illustrates a further type of hub spring installation wherein yoke 104 mounted on pylon 100 from a mounting which permits pivotal motion on axis 101 is provided with a bottom dished member 120 which is connected to a confronting spherical element 121 by way of an elastomeric body 122. The body 122 serves as a hub spring which opposes fitting of the yoke 104 relative to pylon 100. (It should be noted that the axis 101 must be rotated 90° from the position shown in FIG. 11.)

From the foregoing, it will be seen that the rotor underslinging required for the isolation of the two-per-rev hub spring moments of a two-bladed teetering rotor depends strongly upon the blades' first in-plane frequency. The placement of the first cantilevered in-plane frequency equal to one-per-rev in the rotating system makes the blade in-plane mode act as a dynamic absorber which effectively isolates the two-per-rev hub motion generated by spring moments.

Thus, in accordance with the present invention, means are provided to eliminate hub spring moments in a teetering two-blade rotor provided with a hub spring to incorporate control power at zero-g flight by relating the amount of underslinging to the in-plane frequency of the blade and to the spring rate. In a preferred embodiment, the in-plane frequency is established at one-per-rev in which case the amount of underslinging is independent of the hub spring rate.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In a two-blade teetering rotor helicopter having control power in zero-g flight through a pylon having
    a coupling connected to pivot on a teeter axis transverse to said pylon and to undersling said rotor a predetermined distance below said teeter axis with a hub spring connected between said pylon and said rotor to resist flapping of said rotor about said teeter axis thereby to assure control power to said helicopter, the improvement comprising:

each said blade structured to have a cantilevered in-plane natural frequency when said blade is rotating at the normal r.p.m. of said rotor related to the amount of underslinging and the spring rate of said hub spring to isolate by dynamic absorption two cycles per revolution vibration produced in said pylon by moments due to said hub spring.

2. The combination set forth in claim 1 wherein said predetermined distance differs from the distance required by normal rotor precone by an amount proportional to the spring rate of said hub spring.

3. The combination set forth in claim 2 wherein the cantilevered in-plane natural frequency of each blade of said rotor is greater than one cycle per revolution when said blade is rotating at the normal r.p.m. of said rotor and said predetermined distance is greater than normal distance required by the normal rotor precone.

4. The combination set forth in claim 2 wherein the cantilevered in-plane natural frequency of each blade of said rotor is less than one cycle per revolution when said blade is rotating at the normal r.p.m. of said rotor and said predetermined distance is less than normal distance required by the normal rotor precone.

5. The combination set forth in claim 1 wherein each blade of said rotor includes blade structure having a natural in-plane frequency of 1/rev thereby to isolate vibration due to 2/rev hub spring moments independent of spring rate.

6. A method of providing a two-bladed helicopter teetering rotor which is resiliently restrained from rotor flapping about the transverse axis on a pylon in zero-g flight to provide zero-g control without generating two-per-rev vibrations in the non-rotating system, which comprises:

(a) structurally tuning each helicopter blade of said rotor to have a first cantilevered in-plane frequency of one-per-rev in the rotating system, and (b) mounting said rotor on a pylon to accommodate rotor pivoting about an axis transverse to said pylon to support said blades at a predetermined distance below said axis to isolate by dynamic absorption two-per-rev center of gravity vibrations.

7. In a helicopter having a two-bladed teetering rotor mounted on a pylon, the combination which comprises:

(a) hub spring means connected between said rotor and said pylon to restrain motion of said rotor about a teeter axis transverse to said pylon, and (b) coupling means for accommodating rotation of said rotor about said teeter axis and for supporting said rotor at a distance below said axis related to the in-plane frequency of the helicopter blades and to the spring rate of said hub spring means for isolation by dynamic absorption of two-per-rev hub spring moment vibrations.

8. A two-bladed helicopter having a teetering rotor mounted on a pylon which comprises:

(a) pylon coupling means supporting said rotor a predetermined distance below the rotor center of gravity to isolate two-per-rev rotor center of gravity vibrations, and which accommodates rotor pivoting about an axis transverse to said pylon;

(b) hub spring means connected between said rotor and said pylon to restrain rotor movement about said axis and provide zero-g control power; and (c) means for isolating two-per-rev hub spring moment vibrations.

9. The combination set forth in claim 1 wherein said isolating means includes two helicopter blades structurally tuned to have a first cantilevered in-plane frequency of one-per-rev in the rotating frame.

* * * * *

UNITED STATES PATENT AND TRADEMARK OFFICE
CERTIFICATE OF CORRECTION

PATENT NO. : 4,115,031

DATED : September 19, 1978

INVENTOR(S) : Jan M. Drees, Walter G. O. Sonneborn and Jing G. Yen

It is certified that error appears in the above-identified patent and that said Letters Patent are hereby corrected as shown below:

Col. 2, line 9, change "dependent" to -- independent --.

Signed and Sealed this

First Day of May 1979

[SEAL]

Attest:

RUTH C. MASON
*Attesting Officer*

DONALD W. BANNER
*Commissioner of Patents and Trademarks*